United States Patent [19]

Fisher et al.

[11] 4,387,335
[45] Jun. 7, 1983

[54] CONSTANT-FREQUENCY DYNAMO WITH STATIONARY ARMATURE

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 287,221

[22] Filed: Jul. 27, 1981

[51] Int. Cl.³ .................... H02P 9/30; H02K 21/10
[52] U.S. Cl. ................................. 322/32; 310/126; 310/263
[58] Field of Search ....................... 310/112–115, 310/126, 263; 322/32

[56] References Cited

U.S. PATENT DOCUMENTS

| | | | |
|---|---|---|---|
| 1,223,095 | 4/1917 | Neuland | 310/114 X |
| 2,782,328 | 2/1957 | Lindberg | 310/126 X |
| 3,308,318 | 3/1967 | Dunaiski et al. | 310/126 X |
| 4,075,519 | 2/1978 | Mrcun | 310/263 X |

Primary Examiner—R. J. Hickey

[57] ABSTRACT

A dynamo with a stationary armature and with two rotors, with the frequency of the armature current the same as the frequency of the field excitation and independent of the speed of rotation of the rotors. The rotors have opposite instantaneous magnetic polarities, are magnetically connected and rotate in opposite directions on concentric shafts. Field excitation may be dc or single-phase ac. Disk or tubular rotor and stator structures may be used. Dynamos according to the invention may function as a d-c generator, an a-c generator, an amplifier, as a-c or d-c rotary transformers, and as a-c or d-c motors.

9 Claims, 8 Drawing Figures

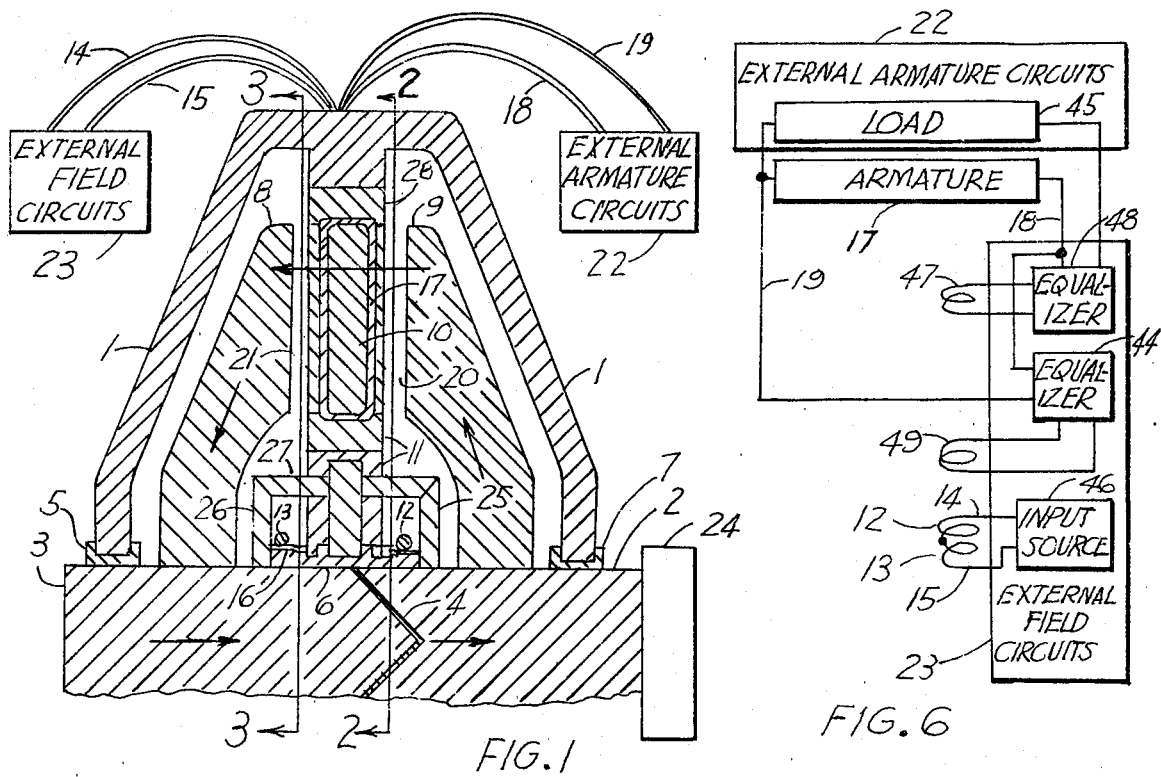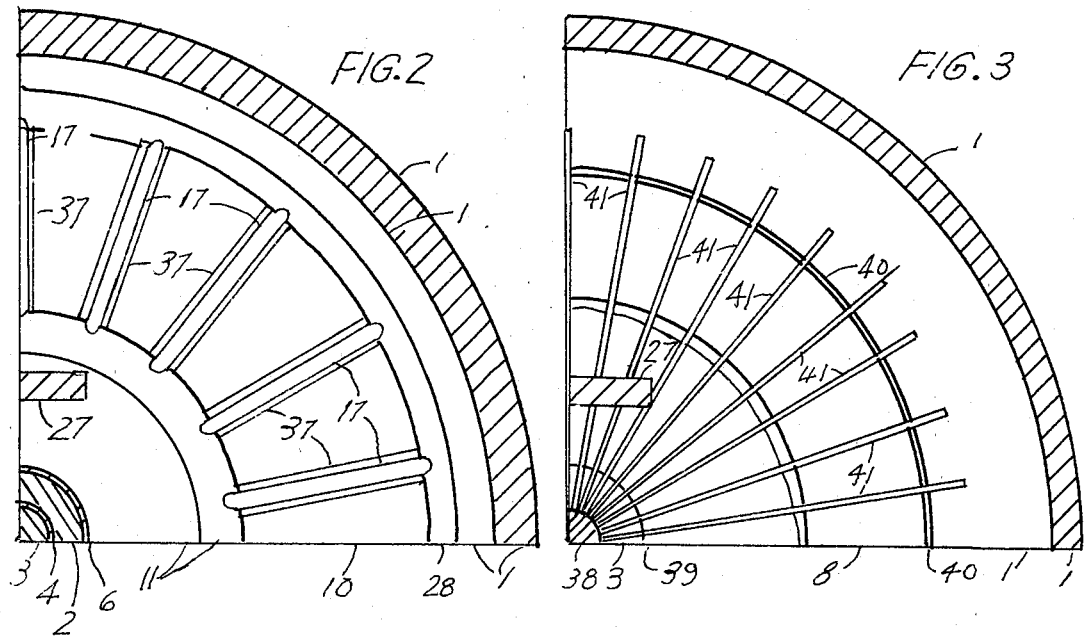

CONSTANT-FREQUENCY DYNAMO WITH STATIONARY ARMATURE

BACKGROUND OF THE INVENTION

This discloses a dynamo with a stationary armature, in which the frequency of the armature current is the same as the frequency of the field excitation and is independent of the rotational speed of the rotor.

We do not know of any similar dynamo of the prior art. The field structure is divided in two sections, oppositely magnetized at any instant and rotating in opposite directions. A dynamo is a rotating electric machine involving interaction of magnetic flux relative to conductors, which includes electric motors and electric generators, which are inherently devices of the same means of operation.

SUMMARY OF THE INVENTION

The invention comprises a dynamo with two magnetic rotors turning in opposite directions, on concentric magnetic shafts, magnetically connected, magnetized so that at any instant the surfaces of the rotors adjacent to the magnetic stator have opposite magnetic polarities, and the rotor surfaces are slotted so that the effective flux path from either rotor to a given point on the magnetic stator varies as the rotor is turned. The rotors may be magnetized by a permanent magnet or by a field winding carrying ac or dc. The armature windings may be one or more toroidal windings on the stator, so that the rotating flux from the rotors to the stator cuts across the turns of the armature windings. The dynamo requires no armature switches or commutator and functions with the frequency of the field current the same as the frequency of the armature current, as an a-c or d-c generator, an a-c amplifier, an a-c or d-c rotary transformer or an a-c or d-c motor. The dynamo may use tubular or disk stator and rotors.

BRIEF DESCRIPTION OF DRAWINGS

FIG. 1 shows a sectional view of the upper half of a dynamo according to the invention, using a disk stator, in a plane through the axis of rotation. As the dynamo is symmetrical about a plane vertical to the section plane and passing through the axis of rotation, except for external connections, the view shows only the upper half of the dynamo.

FIG. 2 shows a sectional view of the dynamo of FIG. 1, in a plane passing through airgap 20 centrally, at 90° to the axis of rotation.

FIG. 3 shows a sectional view of the dynamo of FIG. 1, in a plane passing through airgap 21, at 90° to the axis of rotation.

FIG. 6 shows a simplified circuit diagram of an amplifier using a dynamo according to the invention.

DETAILED DESCRIPTION OF THE INVENTION

Figures 4, 5:
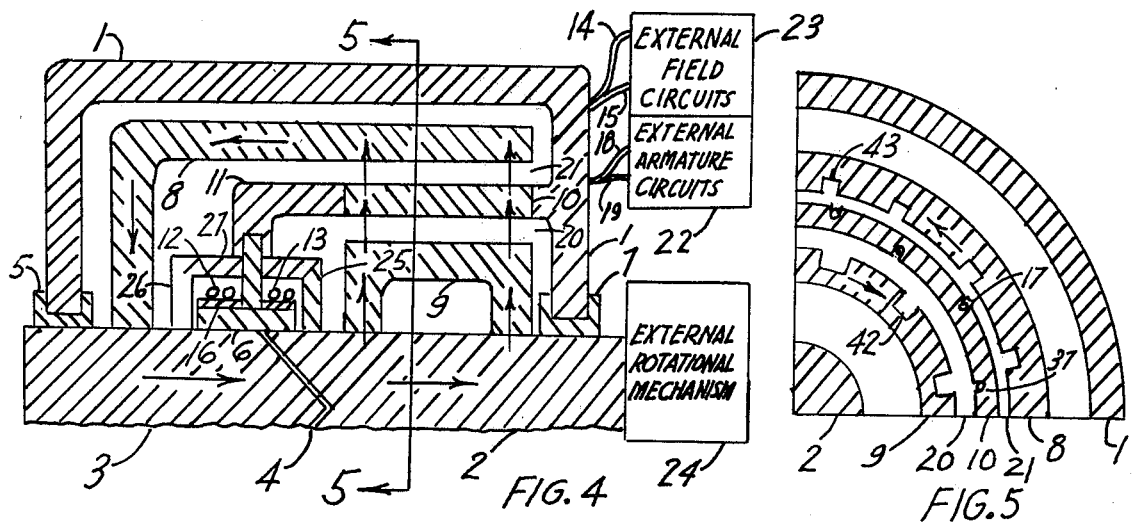
FIG. 4 shows a sectional view of the upper half of a dynamo according to the invention, using a tubular stator, in a plane through the axis of rotation. The comments above on FIG. 1 apply.
FIG. 5 shows a sectional view of the dynamo of FIG. 4, in a plane passing through the approximate mid-point of the inner rotor, at 90° to the axis of rotation.

This invention discloses a dynamo with two magnetic rotors turning in opposite directions on concentric magnetic shafts magnetically connected, and magnetized so that at any instant the surfaces of the two rotors adjacent to the magnetic stator, which carries a toroidal armature winding, have opposite magnetic polarities. The magnetic flux passes from a first rotor across a first air gap to the stator, cutting across a first portion of the turns of the armature winding and inducing a first voltage in them. The magnetic flux flows through the stator, cuts across a second portion of the turns of the armature winding inducing a second voltage which aids the first voltage, due to the opposite directions of rotation of the rotors, crosses the air gap to the second rotor and returns through the rotor shafts to the first rotor.

The rotors have the surfaces adjacent to the stator slotted or otherwise altered, so that the flux cutting a portion of a turn of the armature winding is altered in intensity as the rotors turn, thus a separate magnetic field rotates with each of the rotors and interacts with conductors of the stator armature winding. The total armature flux interaction depends on the intensity of field magnetization, the number of armature turns in series and the rotor speeds. The frequency of the armature voltage is the same as the frequency of the field magnetization and is independent of the rotor speeds.

The two preceding and the following paragraphs describe a dynamo functioning as a generator or a motor.

The waveform of the armature voltage depends on the waveform of the field magnetization and on the physical shape of the rotor surfaces adjacent to the stator. The copper loss depends on the ratio of active length to total length of armature conductor, and this loss may be small compared to dynamos of the prior art. The iron loss is comparatively small in d-c dynamos according to the invention, as a substantial part of the magnetic flux path conducts flux of constant amplitude and zero frequency.

In a-c dynamos according to the invention all parts of the magnetic path carry alternating flux and are constructed of magnetic material, preferably of good permeability and low loss in the direction of the flux in them. Such materials may be thin insulated laminations with the flux path parallel to the surface of the laminations, or cast or molded magnetic materials with good permeability and low loss for flux in any direction, which may be reinforced or supported by stronger materials with low permeability and conductivity. The dynamo design avoids paths of low resistance closely encircling parts carrying varying flux. This is readily achieved by constructing such paths of poor conductors, or slotting or otherwise breaking the continuity of any paths of low resistance material.

The requirement that the two rotors be rotated in opposite directions may be met by connecting shafts separately to an external mechanism, or may be met by inserting a reversing mechanism, such as the bevel gears shown in FIG. 1, located at the junction of the shafts between the two rotors.

When a dynamo according to the invention is used as an amplifier the input wave to be amplified is delivered to the field magnetizing windings and the amplified output is delivered by the armature winding. The amplifier gain is proportional to the rotational speeds. Negative feedback of conventional current or voltage types may be obtained by connecting the armature winding in the correct phase to a series field magnetizing winding or a shunt field magnetizing winding, with equalization of phase and frequency response of the feedback loop as necessary, according to conventional negative-feedback theory. In this way a high-efficiency, high-power amplifier with a response down to a low frequency may be obtained. The energy required for the amplified output is obtained from the mechanical rotation of the rotors.

When a dynamo according to the invention carries two or more separate armature windings, one of which is connected to an external source of power, it may function as a rotary transformer. The rotors are turned at speeds and in directions which under no-load conditions generate a voltage in the winding connected to the power source (equivalent to the primary winding of a conventional transformer), which is substantially equal and opposite in phase to the voltage of the source, so that no current (equivalent to zero no-load magnetizing current in a conventional transformer), flows in the primary winding under no-load conditions. Thus the number of primary turns and the area of the magnetic flux path may be reduced from a conventional transformer, depending on the field magnetization and the speed of rotation. When a load is applied to a second stator winding (equivalent to a secondary winding of a conventional transformer), primary and secondary currents flow, but through a smaller number of turns and hence with less loss than in a conventional transformer. Thus both the no-load and full-load losses may be materially less than in a conventional stationary transformer, after allowing for power required to rotate and to magnetize th rotors of the transformer. The excitation field or magnetizing current in an a-c transformer may be shifted in phase by a series capacitor or other suitable means, so that the no-load voltage generated in the primary stator winding is substantially in phase opposition to, and of the same frequency as, the voltage applied to the primary stator winding by the external a-c power source. When the phase of the magnetizing current is suitably altered from the above relationship, by changing the value of phase shift, the transformer produces a secondary voltage lagging or leading the phase of the voltage of the external source for the primary.

A d-c transformer may be obtained in a similar manner to the a-c transformer, except that the series capacitor or other suitable phase shifter is not required and a d-c source is used in place of an a-c source.

A dynamo according to the invention functions as a motor, generator, amplifier or transformer, with either or both series and shunt compound field windings, analogous to the compound windings of a conventional d-c dynamo, with the current in the compound windings suitably shifted in phase from the armature current so that the currents in the compound field windings are substantially in or out of phase with the flux in the main field winding. If the phase of the current in the compound windings of an a-c dynamo is suitably shifted from these relationships, it is clear that the a-c dynamo or transformer has an armature voltage which lags or leads the armature current, as may be desired.

The figures and descriptions herein apply to d-c or single-phase a-c dynamos. For polyphase a-c dynamos a pair of rotors is required for each phase, each pair with a separate stator and a separate magnetizing winding connected to a different phase of a polyphase magnetizing current supply. Rotor shafts may be mechanically connected as long as the two rotors pertaining to each phase rotate in opposite directions.

The generators of this invention have special value with prime movers where the most efficient prime mover may have a speed not suitable for the power frequency desired using a conventional generator. With dynamos according to this invention the prime movers can be designed to run at optimum speed, which need not be held constant, as the generated frequency is independent of shaft speed, with prime movers and generator shafts at the same speed.

FIG. 1 shows a sectional view of a dynamo according to the invention, using a disk armature stator structure, in a plane passing through the axis of rotation. A frame 1, preferably of non-magnetic material but in any case arranged to carry little or no magnetic flux, supports concentric shafts 2 and 3 of magnetic material, rotating in opposite directions and separated by a thin anti-friction spacer 4, in the form of a right circular cone, form a low-reluctance magnetic bearing. Shafts 2 and 3 turn in anti-friction bearings 7 and 5 respectively, supported in frame 1, and in anti-friction bearing 6 supported by preferably non-magnetic stationary disk 11 and bridging the space occupied by spacer 4. Preferably, the flux in shafts 2 and 3 does not extend beyond the outer edges of rotors 9 and 8. Spacer 4, bearing 6, disk 11 and former 16 are not magnetically conducting.

Near the junction of shafts 2 and 3 they are encircled by one or more insulated electrically conducting series-aiding main field windings 12 and 13, which are wound on stationary former 16, spaced from the shafts, lying between rotors 8 and 9, and supported by disk 11, with external field winding leads 14 and 15 passing to exterior field circuits 23 through field structure 10. Shaft 2 carries magnetic rotor 9 and shaft 3 carries magnetic rotor 8. Rotors 8 and 9 are of generally circular disk shape, with their inner faces slotted at intervals by slots not shown in FIG. 1. Shaft 2 is rotationally connected to means 24.

The stator structure consists of an annular magnetic disk 10 between rotors 9 and 8, with air gaps 20 and 21 respectively which may be of variable widths in a radial direction, and is supported by frame 1 and disk 11. Annular ring 10 carries, on its surface or in slots, one or more insulated toroidal series-aiding conducting armature windings 17, with connections 18 and 19 to external armature circuits 22 through frame 1.

In a d-c dynamo field windings 13 and 14 may be replaced by one or more permanent magnets located longitudinally in shafts 2 and 3, or radially magnetized rings between shafts 2 and 3 and rotors 9 and 8 respectively.

The main flux path for one polarity of the permanent magnets or for one polarity of current flowing in the field coils is shown by the undesignated arrows and passes longitudinally in the right-hand direction through shaft 2, radially outwards and longitudinally through rotor 9, crosses airgap 20 and a first portion of winding 17 substantially at right angles to the turns of winding 17, passes from right to left through stator core 10, crosses a second portion of winding 17 and airgap 21 substantially at right angles to the turns of the winding, passes radially inwards through rotor 8 to shaft 3 and passes longitudinally along shaft 3 across spacer 4 to shaft 2. We now assume the dynamo is a generator.

As the magnetic flux from rotor 8 rotates in one direction, and the magnetic flux from rotor 9 rotates in the opposite direction, voltages of opposed polarity at any instant are induced in the left and right-hand sides of each turn of winding 17, so that the turns may be connected series-aiding as a toroidal winding.

A well-known mechanism for reversing the direction of rotation of shaft 3, assuming shaft 2 is rotated by external rotational mechanism 24, consists of bevel gear 25 mounted on shaft 2, bevel gear 26 mounted on shaft 3, and idler bevel gear 27 mounted on shaft supported by disk 11 and bearing 6 and hence does not rotate around the axis of rotation of shafts 2 and 3.

FIG. 2 shows the sectional view 2—2 of FIG. 1 looking to the left-hand side, in a plane passing through airgap 20, at right angles to the axis of rotation, so that it shows the toroidal winding 17 in slots 37 on the face of stator 10. Each slot may contain one turn, a plurality of turns in series with one lead continuing to an adjacent slot, or one or more turns of two or more separate toroidal armature windings, each continuing to an adjacent slot. The turns may be radial as shown, or may depart by a small but material angle from the radial position, and may be of alternate long and short lengths with longitudinal holes through the stator at the end of each short turn, or may be of a single length. Three or more lengths may also be used. All turns may be connected to form one toroidal winding or more than one winding. Non-magnetic band 28 may be slotted to allow the turns of winding 17 to pass through, as shown, or the surface of annular disk 10 may be slotted for this purpose.

The faces of rotors 8 and 9 are also slotted by radial slots in order to cause each magnetic field passing between a rotor and the stator to rotate with the rotor. These slots are not shown in the drawings, but are substantially radial in direction, with dimensions and contour determined by the material of the rotor and the detailed design of the dynamo, are not necessarily parallel to, spaced at the same angle, or with the same length and number of rows as the stator slots. The rotor slots may be in the form of partial or complete spirals. Slots on one rotor are not required to coincide in number, length, direction or linearity with the slots on the other rotor.

When the dynamo of FIG. 1 is used with dc magnetization, as is caused by dc flowing in coils 12 and 13, or by permanent magnets in one or more of the shafts or one or more of the rotors, shafts 2 and 3 and rotors 8 and 9 carry a substantially constant direction and amount of flux, and may be of high-loss magnetic material, preferably of low reluctance. There is a small a-c flux near the surface of each rotor adjacent to the stator, and in some cases the rotor surface may be low-loss magnetic material.

In an a-c dynamo, where permanent magnets cannot be used, ac flows in windings 12 and 13 and the shafts and rotors are preferably constructed of low-loss magnetic material. This may be a solid material which has been molded or cast to shape, with subsequent machining if necessary, or may be laminations of low magnetic loss, as shown in FIG. 3, which is sectional view 3—3 of the dynamo of FIG. 1, looking to the left-hand side, in a plane passing through airgap 21 at right angles to the axis of rotation, and which shows laminations 41 forming shaft 3 and rotor 8. The laminations may be held rigidly to a central support 38, which passes externally to bearings, by a non-conducting band 39, and may be supported to form the rotor by non-conducting band 40, or by one of several other suitable methods. The laminated rotor structure does not require radial slotting.

The stator core 10 of both an a-c and a d-c dynamo is preferably constructed of magnetic material with good permeability and low loss for flux of varying intensity. The stator core may be a tape-wound core or a cast or molded core of magnetic material, slotted on each side to carry the armature winding. The stator core may be supported internally by disk 11 and externally by frame 1 and strong non-conducting band 28, as shown in FIGS. 1 and 2.

FIG. 4 shows a sectional view of a dynamo according to the invention, using an annular tubular type of armature structure, in a plane passing through the axis of rotation. The dynamo of FIG. 4 is basically identical with the dynamo of FIG. 1 and the same theory is applicable, but the arrangement of the parts has been altered to decrease the armature iron and copper loss, by reducing the volume of stator 10 and increasing the ratio of length of active armature conductor to total length of armature conductor. Parts of the dynamo of FIG. 4 corresponding to similarly-functioning parts of FIG. 1 carry the same designations.

In FIG. 4 a high-reluctance frame 1 supports concentric shafts 2 and 3 of magnetic material, rotating in opposite directions and separated by thin anti-friction spacer 4 to form a low-reluctance magnetic connection. Shafts 2 and 3 turn in anti-friction bearings 7 and 5 respectively, supported in frame 1, and in anti-friction bearing 6 supported from non-magnetic disk 11 from stator core 10. Bearing 6 bridges the space occupied by spacer 4.

Near the junction of shafts 2 and 3 they are encircled by one or more series-aiding insulated conducting main field windings 12 and 13, which are wound on stationary former 16, supported on bearing 6 and located between rotors 8 and 9, with external field winding leads 14 and 15, passing to exterior field circuits 23 through stator core 10. Shaft 2 carries tubular magnetic rotor 9, slotted on its outer surface by slots 42 shown in FIG. 5, which are at least approximately parallel to the axis of rotation.

The stator structure consists of a circular magnetic tube 10, encircling and concentric to rotor 9 with airgap 20 between rotor 9 and stator 10, stator 10 carrying, on its surface or in slots 37, one or more toroidal conducting insulated series-aiding armature windings 17, with connections 18 and 19 to external armature circuits 22 through frame 1.

In a d-c dynamo field windings 13 and 12 may be replaced by one or more permanent magnets located longitudinally in shafts 2 and 3, or by radially magnetized rings between shafts 2 and 3 and the magnetic paths to rotors 9 and 8 respectively.

Shaft 3 carries tubular magnetic rotor 8 slotted on its inner surface by longitudinal slots 43 shown in FIG. 5, which are approximately parallel to the axis of rotation. Rotor 8 surrounds and is separated from stator 10 by airgap 21.

The main flux path for one polarity of the permanent magnets or for one polarity of current flowing in the field coils, is shown by the undesignated arrows, and passes longitudinally in the right-hand direction through shaft 2, radially outwards through the magnetic supports for rotor 9, crosses airgap 20 and the inner portion of winding 17, substantially at right angles to the turns of the winding, crosses stator core 10 outwards, crosses the outer portion of winding 17 and airgap 21, substantially at 90° to the turns of the winding, to rotor 8, flows from right to left through rotor 8 and radially inwards to shaft 3, and then from left to right through shaft 3, across spacer 4 and through shaft 2.

As the magnetic flux from rotor 9 rotates in one direction, and the magnetic flux from rotor 8 rotates in the opposite direction, voltages of opposed polarity at any instant are induced in the inner and outer sides of each turn of winding 17, so that the turns may be connected series-aiding as a toroidal winding.

A well-known mechanism for reversing the direction of rotation of shaft 3, assuming shaft 2 connected to external rotational mechanism 24, consists of bevel gear 25 mounted on shaft 2, bevel gear 26 mounted on shaft 3, and one or more idler bevel gears 27 mounted on shafts which are supported by frame 11 and bearing 6 and hence do not rotate around the axis of rotation of shafts 2 and 3. Shafts 2 and 3 may rotate oppositely with external means.

FIG. 5 shows the sectional view 5—5 of FIG. 4, looking to the left-hand side, in a plane passing approximately at the center of rotor 9, at right angles to the axis of rotation, so that itshows the toroidal winding 17 in slots 37 in stator core 10, slots 43 in rotor 8 and slots 42 in rotor 9 in order to cause rotation of the main flux. Slots 37 are preferably located at regular intervals alternately on each side of stator core 10 in order to accommodate winding 17. Slots 42 and 43 may be different from each other and from slots 37 in dimensions and spacing, and may depart from straight lines and diverge from parallelism to the axis of rotation. The undesignated arrows show that rotors 8 and 9 turn in opposite directions, the directions being arbitrarily chosen.

When the dynamo of FIG. 4 is used with dc magnetization, as is caused by dc flowing in coils 12 and 13 or by permanent magnetization of the main flux path, shafts 2 and 3 and rotors 8 and 9 carry a substantially constant direction and amount of flux and may be of high-loss magnetic materials, preferably of low reluctance. There is a small a-c flux near the surface of each rotor adjacent to the stator, and each rotor's surface layer may be of low-loss magnetic material.

In an a-c dynamo, where permanent magnets cannot be used, ac is supplied to windings 12 and 13, the shafts, rotors and their magnetic supports and the stator are preferably constructed of low-loss magnetic material. This may be a solid material which has been cast or molded to shape, with subsequent machining if necessary, or may be laminations suitably oriented to keep the magnetic path reluctance and magnetic loss low. Laminations lying in planes passing through the axis of rotation, analogous to those in FIG. 3 are suitable if retained in position by strong non-conducting bands, or other suitable means.

FIG. 6 shows a simplified circuit diagram of an amplifier using a dynamo according to the invention. The dynamo of FIG. 1 or FIG. 4 may be used. The input wave to be amplified from source 46 is delivered by external field circuits 23 so that an equal voltage of each frequency component to be amplified in the input wave causes substantially equal current to flow in the series-connected windings 12 and 13. The amplified output wave is delivered by armature winding 17 to a load circuit 45 in external armature circuits 22. If current-type negative feedback is desired an additional field winding 47 is connected through delay and frequency response equalizer 48, forming part of external field circuits 23, in series with load 45, in accordance with conventional negative-feedback theory. If voltage-type negative feedback is desired an additional field winding 49 is connected across load 45, or a part of it, through a delay and frequency response equalizer 44 forming part of external field circuits 23, in accordance with conventional negative-feedback theory.

Figures 7, 8:
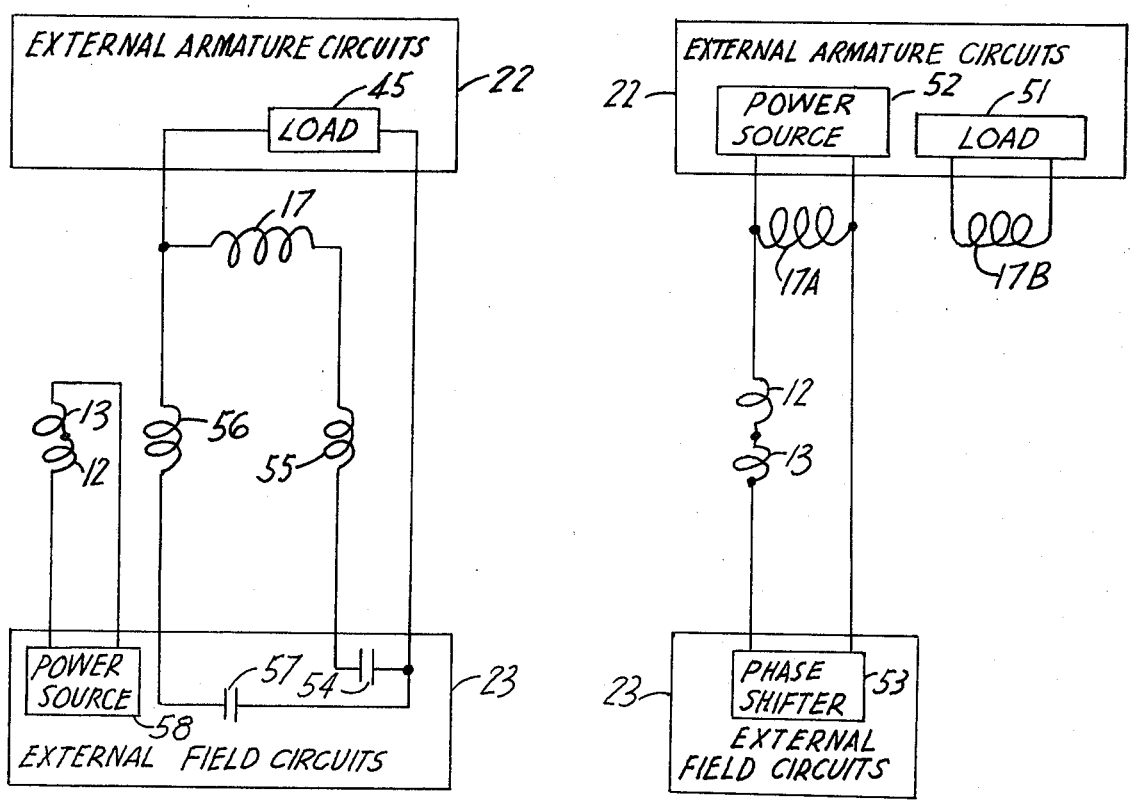
FIG. 7 shows a simplified circuit diagram of a transformer using a dynamo according to the invention.
FIG. 8 shows a simplified circuit diagram of a dynamo according to the invention with shunt and series compound field windings.

FIG. 7 shows a simplified circuit diagram of a rotary transformer using a dynamo according to the invention. The armature winding 17 consists of two coupled windings, a primary 17A and a secondary 17B. Secondary 17B is connected to load circuit 51 which forms part of external armature circuits 22. Primary 17A is connected to power source 52 which forms part of external armature circuits 22 and is connected to external field circuits 23, causing a current to flow in field windings 12 and 13 through phase shifter 53, used only with as in field circuits 23, so that with load circuit 51 disconnected, constant speeds of rotation of rotors 8 and 9 and constant voltage, phase and frequency of power source 52, the induced voltage in winding 17A is substantially equal in voltage and opposed in phase to the output of power source 52, and the no-load current in winding 17A is substantially zero. When load circuit 51 is connected, current flows in winding 17B, causing current to flow from power source 52 to winding 17A, so that windings 17A and 17B form a transformer. If power source 52 is ac and phase shifter 53 is altered in a suitable way from the previous setting, winding 17A will draw either a leading or lagging current from power source 52 as desired, so that the transformer of FIG. 7 may also function for power-factor correction.

FIG. 8 shows a simplified schematic drawing of a dynamo according to the invention with compound field windings. The armature winding 17 is connected to load 45 through series field winding 55 in series with phase shifter 54, here shown as a capacitor. The voltage across load 45 is connected through phase shifter 57, here shown as a capacitor, to shunt field winding 56. The source of magnetizing power 58 is connected to main field windings 12 and 13. Items 54, 57 and 58 are contained in external field circuits 23. If source 58 is dc, phase shifters 54 and 57 are omitted and the dynamo functions as a conventional compound d-c generator. If source 58 is ac, phase shifters 54 and 57 are connected, and are adjusted to cause the currents in each of fields 55 and 56 to be in phase or out of phase with the current in fields 12 and 13. Under these conditions the a-c dynamo functions as an a-c generator, in a manner analogous to a conventional compound d-c generator. When phase shifters 54 and 57 are altered from the above adjustments the current in load 45 is clearly caused to lag or lead the voltage across load 45, as may be desired.

In FIGS. 1 and 2 field coils 12 and 13 are shown stationary, but in some designs it may be desirable to allow windings 12 and 13 to rotate with one of shafts 2 or 3, and bring field coil leads 14 and 15 longitudinally through the shaft to slip-rings on the shaft, not shown, and thence through stationary brushes to external field circuits.

FIGS. 1 and 4 show two armature leads 18 and 19, and two field leads 14 and 15. Where more than one armature winding are equipped, additional armature leads not shown are required, and when more field windings than 12 and 13 are equipped, additional field leads not shown are required.

The rotating rotors cause the field flux to rotate across portions of armature winding 17, but in order to cause this rotation the slots in each rotor must offer substantially greater reluctance to the flux flowing between the rotor and the stator than the reluctance of the stator slots.

In FIGS. 1 and 4 an internal mechanical reversing mechanism with a single external rotational mechanism 24 is shown for shafts 2 and 3, but reversing mechanism 5 may be omitted and, as stated above, each shaft be connected to a separate external rotational mechanism. Alternatively a single external rotational mechanism may be provided for both shafts. The requirement is that the shafts must rotate in opposite directions, not necessarily at the same or at constant speeds.

Since many changes could be made in the above construction and many apparently widely different embodiments of this invention could be made without departing from the scope thereof, it is intended that all matter contained in the above description or shown in the accompanying drawings shall be interpreted as being illustrated only and not limiting.

We claim:
1. A dynamo which comprises:
first and second coaxial rotating field structures, and
mechanical reversing means which is connected to said rotating field structures, and which causes said field structures, when rotating, to rotate in opposite directions, and
means for connection of said mechanical reversing means to external rotational means, and
a low-reluctance magnetic connection with a first magnetic pole magnetically connected to the first of said rotating field structures, and a second magnetic pole magnetically connected to the second of said rotating field structures, and
magnetizing means for said low-reluctance magnetic connection which generates said first and said second magnetic poles, and
an annular magnetic stationary armature, carrying one or more toroidal armature windings, located between said first and said second rotating field structures, and
a first path of low magnetic reluctance between said first rotating field structure and a first portion of said armature windings, and
a second path of low magnetic reluctance between said second rotating field structure and a second portion of said armature windings, and
means for connecting said armature windings to external armature circuits, without sliding contacts, and
means for connecting said magnetizing means to external field circuits.

2. A dynamo according to claim 1, which comprises:
an annular magnetic stator carrying at least one continuous, conducting, multi-turn, insulated, toroidal, armature winding, connected to external armature circuits, concentric with the axis of rotation of said dynamo, and
a first annular magnetic rotor, concentric with said axis of rotation, substantially co-extensive to said stator, rotating in a first direction, with a portion of the surface of said first rotor adjacent to, and separated by a first airgap from, a first portion of said turns of said armature winding, and
a second annular magnetic rotor, concentric with said axis of rotation substantially co-extensive with said stator, rotating in a second direction, with a portion of the surface of said second rotor adjacent to, and separated by a second air gap from, a second portion of said turns of said armature winding, and a first magnetic shaft concentric with said axis of rotation and mechanically and magnetically connected to said first rotor, and
a second magnetic shaft concentric with said axis of rotation and mechanically and magnetically connected to said second rotor, and
a low-reluctance magnetic joint between said first and said second shafts, located between the point of magnetic connection of said first shaft to said first rotor and the point of magnetic connection of said second shaft to said second rotor, capable of rotary motion, and
magnetizing means which causes said first rotor to have a first magnetic polarity and said second rotor to have a second opposed magnetic polarity, at every instant, and causes magnetic flux to flow over the magnetic path from said first shaft to said first rotor, across said first airgap, across said first portion of said armature winding, through said stator, across said second portion of said armature winding, through said second rotor to said second shaft, and through said second shaft across said rotary magnetic joint to said first shaft, and
a frame which carries a negligible amount of magnetic flux, which supports said shafts in anti-friction bearings which do not substantially restrict variation of magnetic flux in amount or direction in said flux path, and which maintains said rotors substantially coaxial with said stator, and
a mechanical rotational mechanism connected to said shafts.

3. A dynamo according to claim 2 which comprises:
said stator, in the form of a disk with two substantially plane faces, substantially at 90° to said axis of rotation, the spacing between said plane faces being substantially less than the external diameter of said stator, carrying said armature winding in substantially radial slots in said plane faces of said stator, and
said first rotor, with a substantially plane face substantially at 90° to said axis of rotation, adjacent to, and separated by a first airgap from, a first of said plane faces of said stator, said plane face of said first rotor having a plurality of slots with substantially radial directions, and
said second rotor, with a substantially plane face substantially at 90° to said axis of rotation, adjacent to, and separated by a second airgap from, the second of said plane faces of said stator, said plane face of said second rotor having a plurality of slots with substantially radial directions.

4. A dynamo according to claim 2 which comprises:
said stator, in the form of a circular tube, the thickness of the wall of said tube being substantially less than the length of said tube, carrying an armature winding in substantially longitudinal slots in the cylindrical surfaces of said tube, and
said first rotor, in the form of a circular tube with the thickness of the wall of said tube substantially less than the length of said tube, with the inner cylindrical surface of said first rotor being substantially fully opposite to, surrounding, and separated by a first airgap from, the external cylindrical surface of said stator, the inner cylindrical surface of said first rotor having a plurality of slots with a substantially longitudinal direction, and
said second rotor, with an outer surface carrying a plurality of substantially longitudinal slots, in the form of a circular cylinder, said cylindrical surface of said second rotor being substantially fully opposite to, encircled by, and separated by a second airgap from, the internal cylindrical surface of said stator.

5. A dynamo according to claim 2, in which said shafts are rotated at a substantially constant speed, in which said magnetizing means is a conducting coil which is connected to a source of signal current and said armature winding delivers an amplified replica of said signal current to an external load circuit.

6. A dynamo according to claim 5, which comprises at least one negative-feedback loop consisting of an additional field winding and delay and frequency equalization means, connected so as to deliver a portion of one of: the current in said load, and the voltage across the said load, to said additional field winding.

7. A dynamo according to claim 2, in which said armature winding consists of a first and a second winding, said first winding being connected to a source of power, and a phase shifter which is connected in series with said magnetizing winding across said first armature winding, said phase shifter having a value of phase shift which minimizes the amplitude of the current in said first armature winding when said second armature winding is not connected to a load circuit, and said load circuit which is connected across said second armature winding, so that said dynamo functions as a rotary transformer.

8. A dynamo according to claim 2, in which said armature winding delivers power through an additional field winding and a phase corrector in series, connected in series with said load, so as to form a dynamo with series compounding.

9. A dynamo according to claim 2, in which said armature winding delivers power to an additional field winding and a phase corrector, in series, connected in parallel with said load, so as to form a dynamo with shunt compounding.

* * * * *